Haas & Noll,
Driving Spokes.
N° 14,718. Patented Apr. 22, 1856.
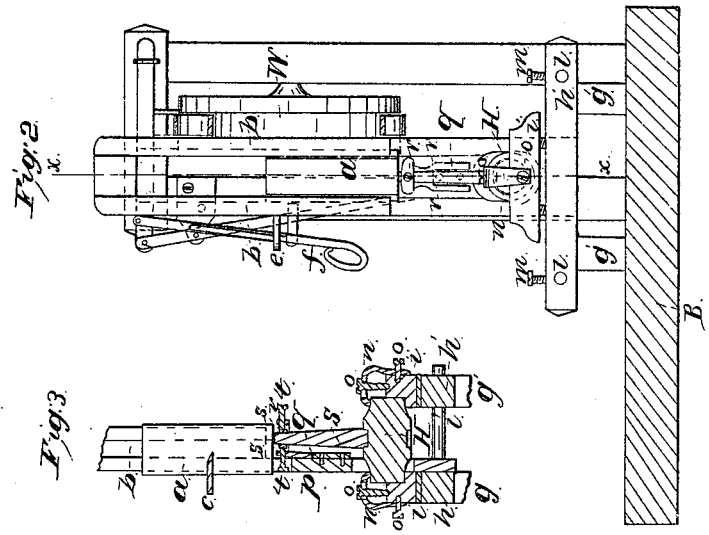
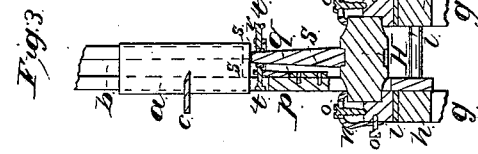
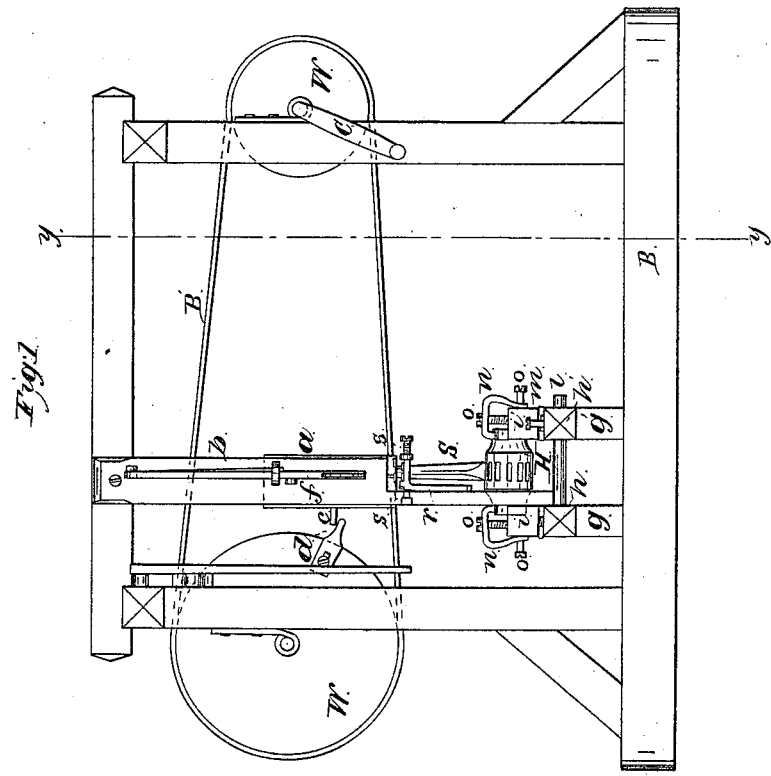

UNITED STATES PATENT OFFICE.

CHRISTIAN HAAS AND JNO. C. NOLL, OF CHICAGO, ILLINOIS.

MACHINE FOR DRIVING SPOKES.

Specification of Letters Patent No. 14,718, dated April 22, 1856.

*To all whom it may concern:*

Be it known that we, CHRISTIAN HAAS and JOHN C. NOLL, of Chicago, in the county of Cook and State of Illinois, have invented a new and useful Improvement in Spoke-Driving Machinery; and we do hereby declare that the following is a full, clear, and exact description of the same, reference being had to the annexed drawing, forming part of this specification, in which—

Figure 1 is a side elevation of the machine. Fig. 2 is an end elevation of the same, after removal of all to right of $y$ $y$. Fig. 3 is a section on $x$ $x$ Fig. 2, through axis of hub.

Similar characters of reference in the several figures denote the same part.

The nature of our invention consists in combining (as will be described) with a vertically operating driver, adjustable spoke guides and hub bed, for facilitating the driving of spokes.

In the drawing $a$ is the driver, movable between vertical guides $b$, by reason of stud $c$ on driver, and arm $d$ of wheel $w$, rotated from wheel $w'$ by band $B'$; power being applied to crank $C$ or in any suitable manner. Movable across guides $b$, by levers $f$, is the rest $e$, to keep the driver elevated during adjustment of hub and spoke.

Beneath the driver and secured to base B of the machine by posts $g$ is the cross timber $h$, upon which is fastened the block $i$, hollowed to receive the end of a hub and constituting a portion of the hub bed. From the timber $h$ runs two bars $l$, which pass through a timber $h'$ supported on posts $g'$; and serve as guides for the lateral movement of said timber, screws $m$ securing said timber in position. Upon timber $h'$ is a block $i'$, hollowed to receive the end of a hub, and with the block $i$ constituting the bed for the hub. Braces $n$ held by screws $o$ serve to secure the hub in its bed. On the face of upright $p$ is fastened slide attachment $q$, upon which is movable vertically, the spoke guide $r$. In the horizontal portion of this guide, are two boxes $s$, adjusted to secure the end of the spoke by means of screws $t$.

The operation of the machine is as follows:—The hub bed is first adjusted to the length of the hub, by moving timber $h'$ along bars $l$, and securing said timber by screws $m$. Hub H is then placed upon the bed and secured therein by the braces $n$, as shown in the drawing. The spoke S is next secured between boxes $s$, and its lower end inserted in the mortise of the hub which is uppermost; the guide $r$ being elevated for that purpose, by passing along its attachment $q$. Power is then applied to the wheel $w'$, and rest $e$ is withdrawn from under the driver. The driver is then lifted by arm $d$ of wheel $w$ and as the contact between said arm and stud $c$ is broken, the driver descends upon the end of the spoke, driving it into the mortise. In this manner the strokes of the driver are repeated until the spoke is driven home: the spoke guide slipping down the guide attachment as the driving proceeds.

By this construction the bed is adjusted to hubs of different sizes; and the spoke secured directly over the mortise and held firmly in a vertical position until driven. When the driving is completed, the spoke guide is removed, clamps or braces $n$ loosened and the hub turned so as to bring another mortise uppermost, when the same operation above described is proceeded with.

We make no claim to the driving arrangement separately considered. But

We claim as new and of our own invention—

The adjustable hub bed and spoke guide in combination with driving apparatus; the several parts being constructed and arranged substantially as, and for the purposes set forth.

In testimony whereof, we have hereunto signed our names before two subscribing witnesses.

CHRISTIAN HAAS.
JOHN C. NOLL.

Witnesses:
ALBERT KEVERES PASAKY,
MICHAEL MILLEMANN.